United States Patent
Katou et al.

(10) Patent No.: US 9,316,798 B2
(45) Date of Patent: Apr. 19, 2016

(54) OPTICAL ASSEMBLY

(75) Inventors: Kiyoshi Katou, Yokohama (JP); Tomomi Sano, Yokohama (JP); Yuji Nakura, Yokkaichi (JP); Masayuki Inoue, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 335 days.

(21) Appl. No.: 13/995,652

(22) PCT Filed: Dec. 1, 2011

(86) PCT No.: PCT/JP2011/077763
§ 371 (c)(1),
(2), (4) Date: Jun. 19, 2013

(87) PCT Pub. No.: WO2012/086383
PCT Pub. Date: Jun. 28, 2012

(65) Prior Publication Data
US 2013/0272663 A1 Oct. 17, 2013

(30) Foreign Application Priority Data
Dec. 24, 2010 (JP) ................. 2010-288015

(51) Int. Cl.
G02B 6/12 (2006.01)
G02B 6/36 (2006.01)
G02B 6/42 (2006.01)
G02B 6/32 (2006.01)
G02B 6/30 (2006.01)

(52) U.S. Cl.
CPC .. G02B 6/42 (2013.01); G02B 6/30 (2013.01); G02B 6/32 (2013.01); G02B 6/4206 (2013.01); G02B 6/428 (2013.01); G02B 6/4263 (2013.01); G02B 6/4292 (2013.01)

(58) Field of Classification Search
CPC . G02B 6/26; G02B 6/30–6/3234; G02B 6/42; G02B 6/4206; G02B 6/4263; G02B 6/428; G02B 6/4292; G02B 6/56; H01L 31/0232; H01S 5/022; H05K 9/00
USPC ................................. 385/88–94, 14
See application file for complete search history.

(56) References Cited

U.S. PATENT DOCUMENTS

2001/0051027 A1* 12/2001 Matsushita .......... G02B 6/4204
385/79
2005/0175299 A1* 8/2005 Hargis ................. G02B 6/4206
385/93

FOREIGN PATENT DOCUMENTS

JP A-7-294777 11/1995
JP A-2004-272061 9/2004
JP A-2009-192566 8/2009

OTHER PUBLICATIONS

Jun. 17, 2014 Japanese Office Action issued in Japanese Application No. 2012-549705 (with translation).
(Continued)

Primary Examiner — Akm Enayet Ullah
Assistant Examiner — Michael Mooney
(74) Attorney, Agent, or Firm — Oliff PLC

(57) ABSTRACT

An optical assembly includes a circuit board including an electrically conductive path formed by printed wiring technology, a photoelectric conversion element connected to the circuit board via the electrically conductive path, a resin member made of light transmissive synthetic resin and attached to the circuit board, and a shielding member made of metal. The resin member includes a sleeve into which a ferrule attached to an end of an optical fiber is inserted and integrally includes a lens through which an optical path passes. The optical path extends between the sleeve and the photoelectric conversion element. The shielding member is connected to the circuit board and arranged to cover the photoelectric conversion element. The shielding member includes a window through which the optical path extends to the photoelectric conversion element.

6 Claims, 16 Drawing Sheets

(56) References Cited

OTHER PUBLICATIONS

International Search Report issued in International Patent Application No. PCT/JP2011/077763 dated Dec. 27, 2011.

Written Opinion of the International Searching Authority issued in International Patent Application No. PCT/JP2011/077763 dated Dec. 27, 2011 (w/ translation).

* cited by examiner

OPTICAL ASSEMBLY

TECHNICAL FIELD

The present invention relates to an optical assembly.

BACKGROUND ART

Patent Document 1 discloses an optical assembly that is fitted to a ferrule attached to an end of an optical fiber. The optical assembly is configured to optically connect the optical fiber and a photoelectric conversion element. The photoelectric conversion element included in the optical assembly is mounted on a stem made of metal. Onto the stem, a cap shell that is made of metal and holds a lens is welded. The cap shell and the lens are fixed to each other with a sealing glass.

In the above-described configuration, the lens focuses optical output from the optical fiber onto the photoelectric conversion element. Further, the lens focuses optical output from the photoelectric conversion element onto the optical fiber. The photoelectric conversion element is electromagnetically shielded by the cap shell made of metal.
Patent Document 1: Japanese Unexamined Patent Publication No. 2009-192566

In the above-described configuration, however, both of the stem and the cap shell are made of metal so as to be connected to each other by welding. This may increase the production cost. In addition, the cap shell made of metal is connected to the lens with the sealing glass. This may also increase the production cost.

Therefore, there is a need in the art to provide an optical assembly that is produced at a reduced cost.

The present invention provides an optical assembly that includes a circuit board including an electrically conductive path formed by printed wiring technology, a photoelectric conversion element connected to the circuit board via the electrically conductive path, a shielding member made of metal, and a resin member made of light transmissive synthetic resin and attached to the circuit board. The shielding member is connected to the circuit board and arranged to cover the photoelectric conversion element. The resin member includes a sleeve into which a ferrule attached to an end of an optical fiber is inserted. The resin member integrally includes a lens through which an optical path passes. The optical path extends between the photoelectric conversion element. The shielding member includes a window through which the optical path extends to the photoelectric conversion element.

According to the present invention, the photoelectric conversion element is connected to the circuit board including the electrically conductive path formed by printed wiring technology. Accordingly, the cost is reduced compared with a case in which the photoelectric conversion element is connected to a metal stem.

The lens is integrally included in the resin member that is made of light transmissive synthetic resin and has the sleeve. In this configuration, a step of fixing a lens to a separate member that is made of a material different from the lens is not required. This reduces the production cost of the optical assembly.

According to the present invention, the production cost of the optical assembly can be reduced.

EXPLANATION OF SYMBOLS

Figure 1:
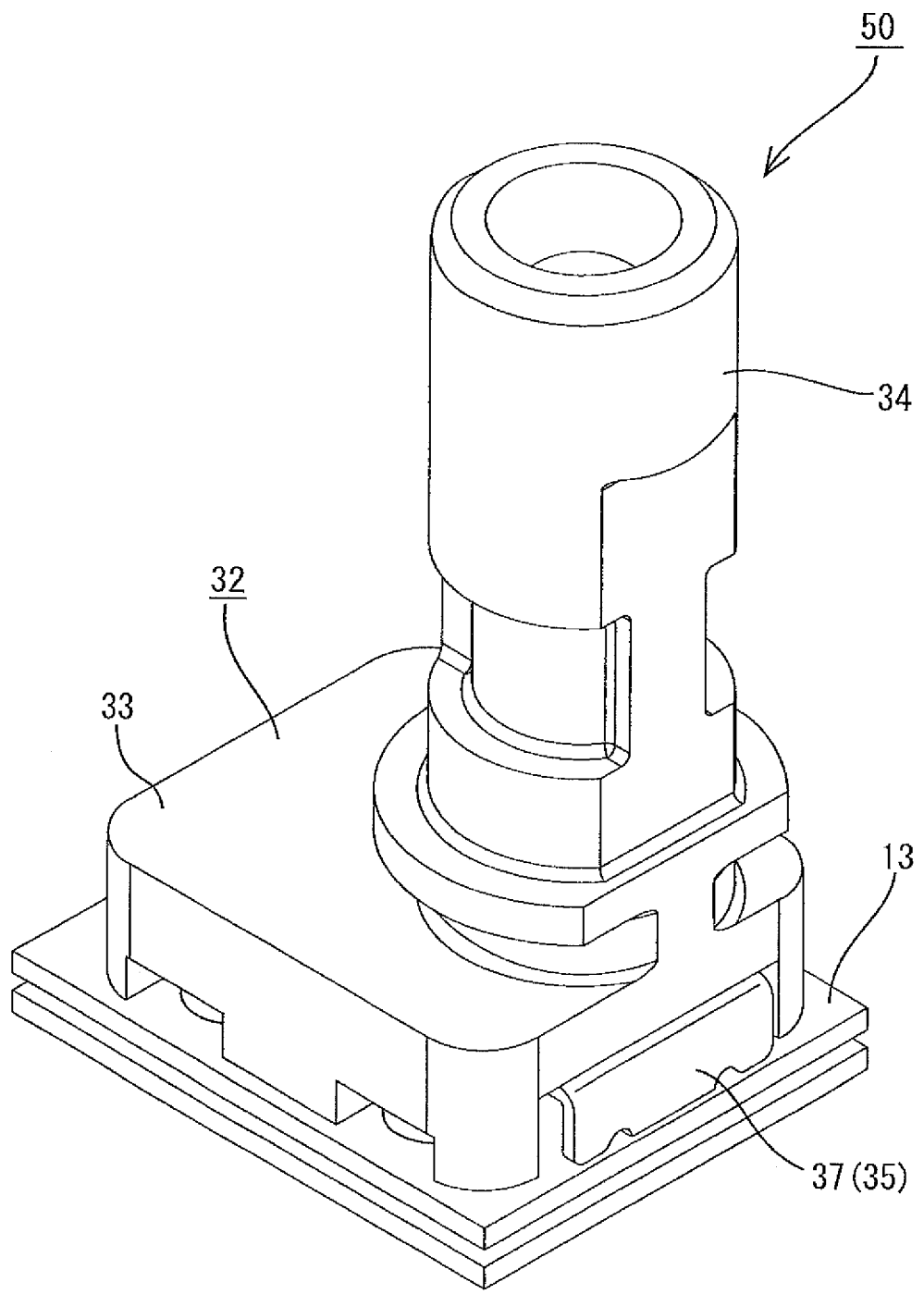
FIG. 1 is a perspective view illustrating an optical assembly according to a first embodiment of the present invention.
Figure 2:
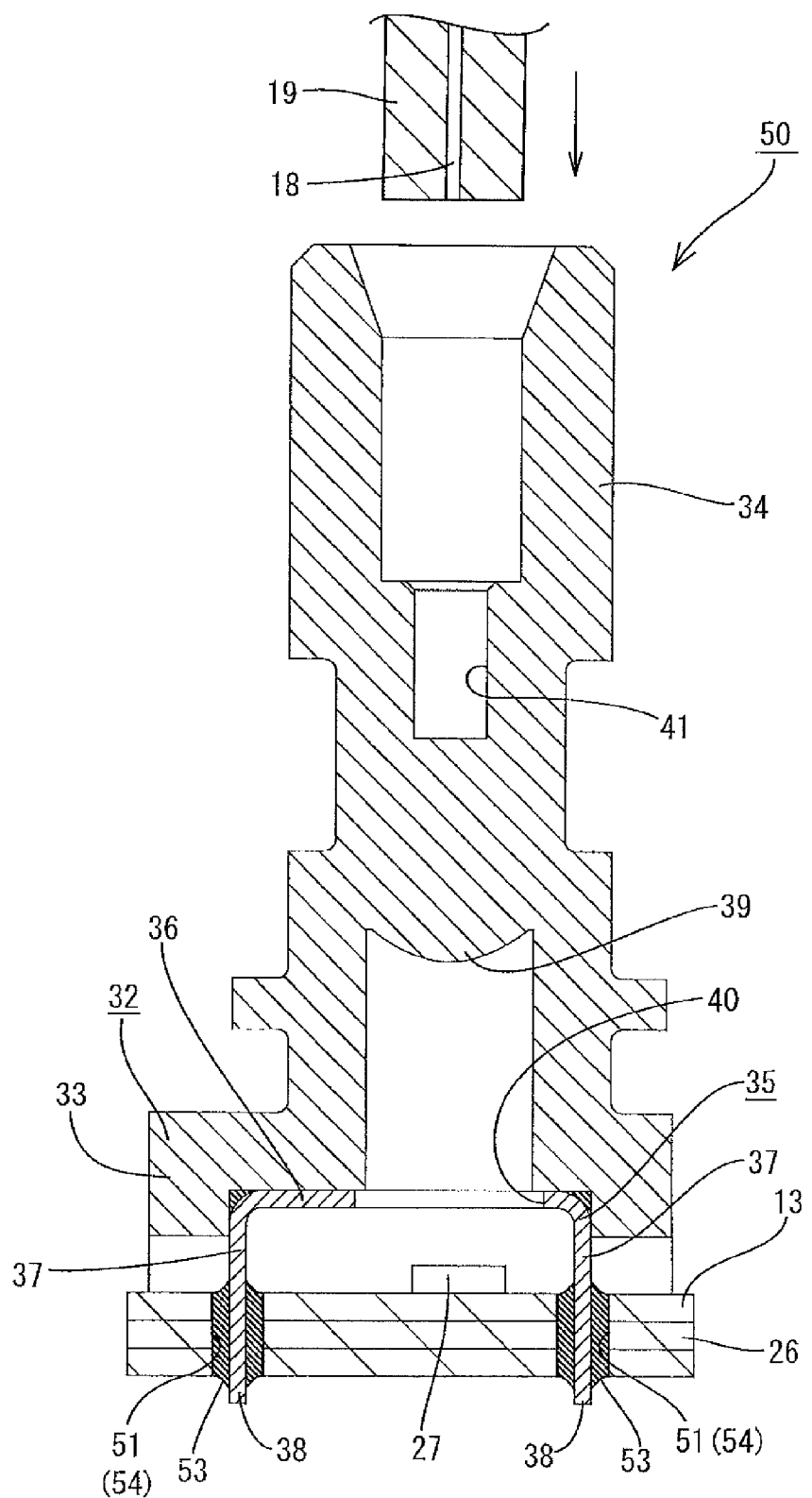
FIG. 2 is a cross-sectional view illustrating the optical assembly.
Figure 3:
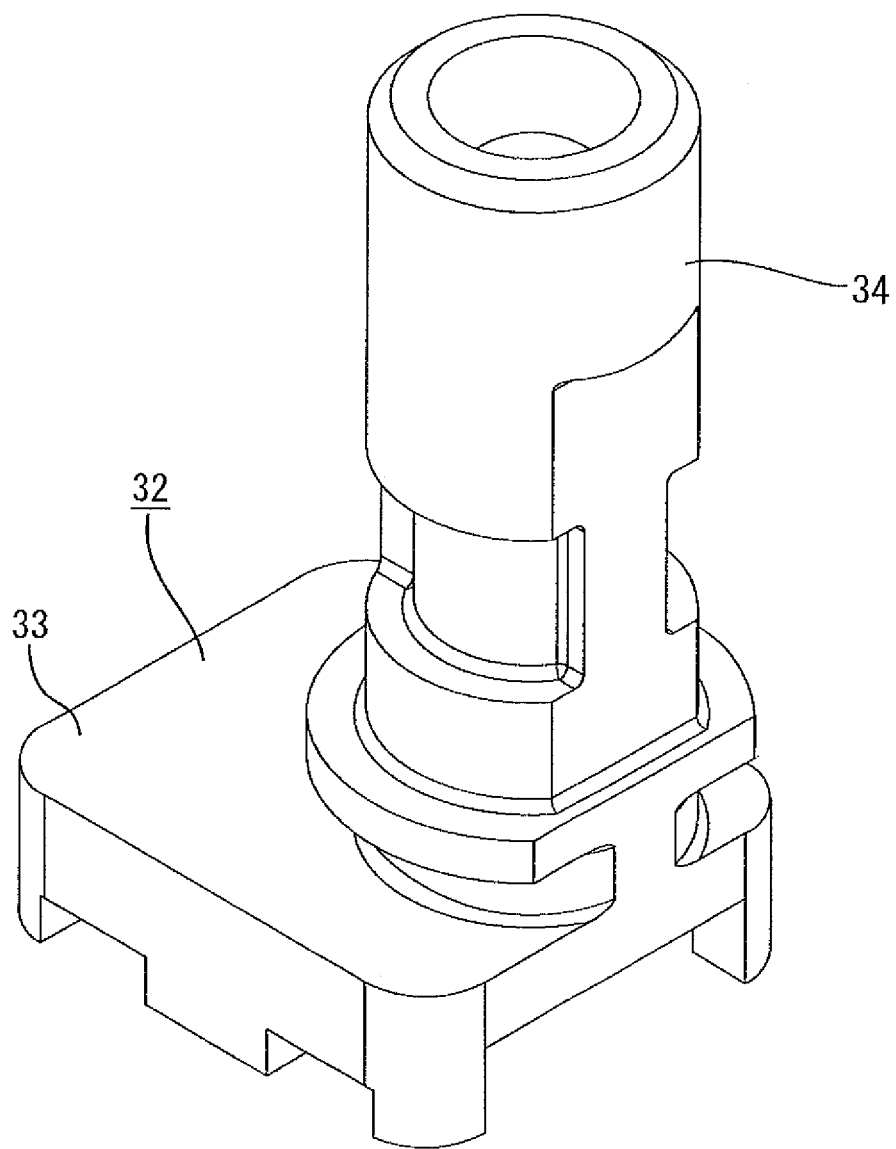
FIG. 3 is a perspective view illustrating a resin member.
Figure 4:
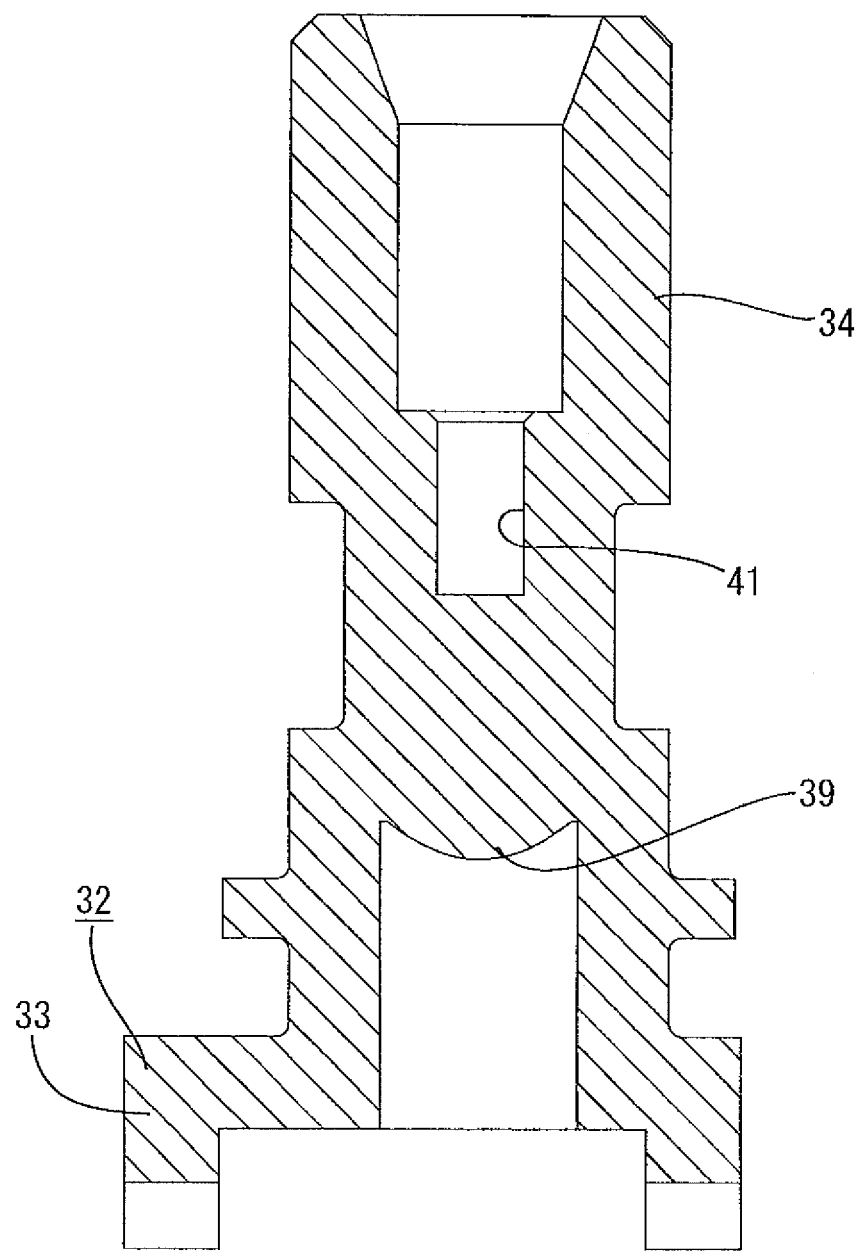
FIG. 4 is a cross-sectional view illustrating the resin member.
Figure 5:
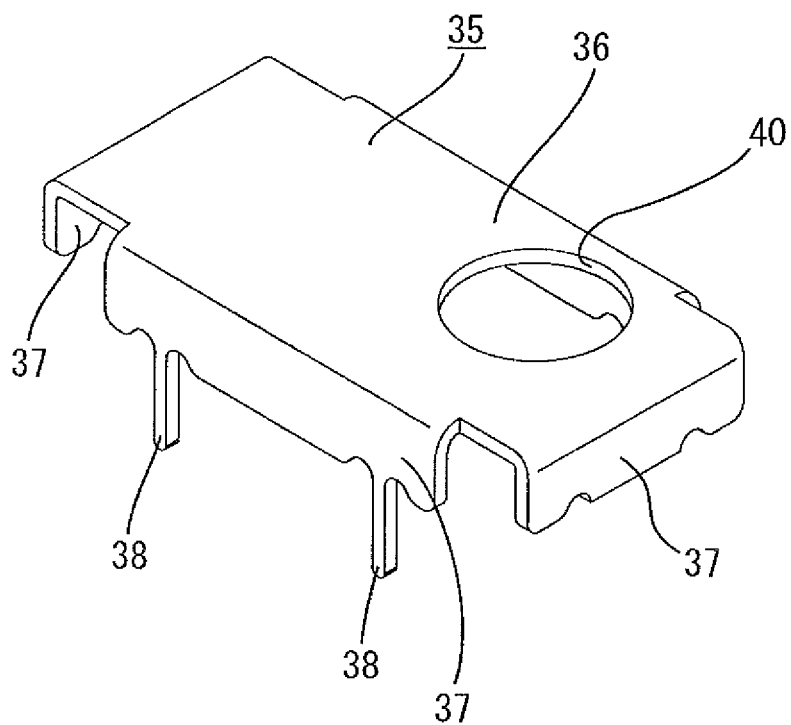
FIG. 5 is a perspective view illustrating a shielding member.

13: Circuit board
18: Optical fiber
19: Ferrule
27: Photoelectric conversion element
32: Resin member
34: Sleeve
35: Shielding member
38: Board connection portion
39: Lens
47: Land
50: Optical member
52: Leg
60: Adhesive layer
70: Adhesive sheet (Adhesive layer)
81: Welding resin

BEST MODE FOR CARRYING OUT THE INVENTION

First Embodiment

A first embodiment of the present invention will be described with reference to FIG. 1 to FIG. 7. The optical assembly 50 according to this embodiment includes a circuit board 13, a photoelectric conversion element 27 mounted on the circuit board 13, and a resin member 32 attached to a plate surface of the circuit board 13. The resin member 32 includes a sleeve 34 to which a ferrule 19 attached to an end of an optical member 18 is fitted. An upper side and a lower side referred in the following description correspond to an upper side and a lower side in FIG. 2, respectively.

(Circuit Board 13)

The circuit board 13 includes electrically conductive path formed by printed wiring technology. In this embodiment, the circuit board 13 includes a flexible board 26 (Flexible Printed Circuit Board) and two printed boards each arranged on an upper surface and a lower surface of the flexible board 26. The printed boards each include an insulating substrate which is provided with the electrically conductive path on at least one of a front surface and a rear surface thereof. The photoelectric conversion element 27 is connected to the electrically conductive path on the upper surface of the circuit board 13 by a conventional method such as a reflow soldering. The photoelectric conversion element 27 includes at least one of a light emitting element and a light receiving element. On the circuit board 13, an electronic component 31 that is different component from the photoelectric conversion element 27 is mounted.

The circuit board 13 includes a plurality of through holes 51 that extend through the circuit board 13 in a vertical direction. On a periphery of each of the through holes 51, a land 47 (an example of an electrically conductive path in claims) is provided by printed wiring technology. On an inner circumferential surface of each of the through holes 51, an electrically conductive path that is continuous with the land 47 is provided.

(Shielding Member 35)

On the plate surface of the circuit board 13 on which the photoelectric conversion element 27 is mounted, a shielding member 35 is attached so as to cover the photoelectric conversion element 27 and the electric component 31. The shielding member 35 electromagnetically shields the photoelectric conversion element 27 and the electric component 31. The shielding member 35 is obtained by pressing a metal plate into a predetermined shape. The shielding member 35 includes a top plate 36 and side plates 37 extending toward the circuit board 13. The top plate 36 has a rectangular shape in a top view. The shielding member 35 includes board connection portions 38 to be connected to the circuit board 13. The board connection portions 38 extend downwardly from a lower end of each side plate 37. The board connection portions 38 are inserted into the respective through holes 51 of the circuit board 13 and soldered to the electrically conductive path of the through hole 51 and the land 47 by a conventional method such as a flow soldering. The through holes 51 are each filled with the solder 53 that is solidified after being melted.

The shielding member 35 is attached to cover the photoelectric conversion element 27 such that the shielding member 35 has light blocking properties with respect to the photoelectric conversion element 27. In other words, the shielding member 35 is configured such that the light outside the resin member 32 hardly reaches the photoelectric conversion element 27.

(Resin Member 32)

On the plate surface of the circuit board 13 on which the photoelectric conversion element 27 is mounted, the resin member 32 is attached to cover the shielding member 35. The resin member 32 is made of light transmissive synthetic resin such as PEI, PC, and PMMA. The resin member 32 includes a base 33 attached to the circuit board 13 and a sleeve 34 extending upwardly from the base 33. The sleeve 34 is configured to receive a ferrule 10 attached to the end of the optical fiber 18. The sleeve 34 has an axis that is substantially perpendicular to the plate surface of the circuit board 13. The wording "substantially perpendicular" implies not only the axis of the sleeve 34 that is not perpendicular to the plate surface of the circuit board 13, but substantially perpendicular to the plate surface, but also the axis of the sleeve 34 that is perpendicular to the plate surface of the circuit board 13.

The base 33 has a rectangular shape in a top view. The sleeve 34 has a tubular shape. The sleeve 34 includes a hole having a closed bottom at a bottom wall thereof. The hole is a relief hole 41 that prevents a contact of a part of the optical fiber 18 inserted in the sleeve 34.

The resin member integrally includes a lens 39 at a lower side of the sleeve 34. The lens 39 is arranged at a position between the sleeve 34 and the photoelectric conversion element 27 in an optical path. The lens 39 has a shape curved downwardly toward the circuit board 13. By the lens 39, the optical output from the optical fiber 18 is focused on the photoelectric conversion element 27 and the optical output from the photoelectric conversion element 27 is focused on a lower end of the optical fiber 18.

The base 33 of the resin member 32 is recessed upwardly at the circuit board side to have a space in which the shielding member 35 is housed. In this embodiment, the shielding member 35 and the resin member 32 are bonded together with an adhesive, which is not illustrated. The top plate 36 of the shielding member 35 includes a window 40 that extends through the top plate 36 in a thickness direction thereof. The window 40 is located in the optical path extending between the photoelectric conversion element 27 and the lens 39. The optical path between the photoelectric conversion element 27 and the lens 39 is secured by the window 40. The window 30 of this embodiment has a circular shape. The shape of the window 40 is not limited to the circular shape. The window 40 may have any shape such as a quadrangular shape, a polygonal shape, and a rectangular shape as necessary.

(Production Process)

Figure 6:
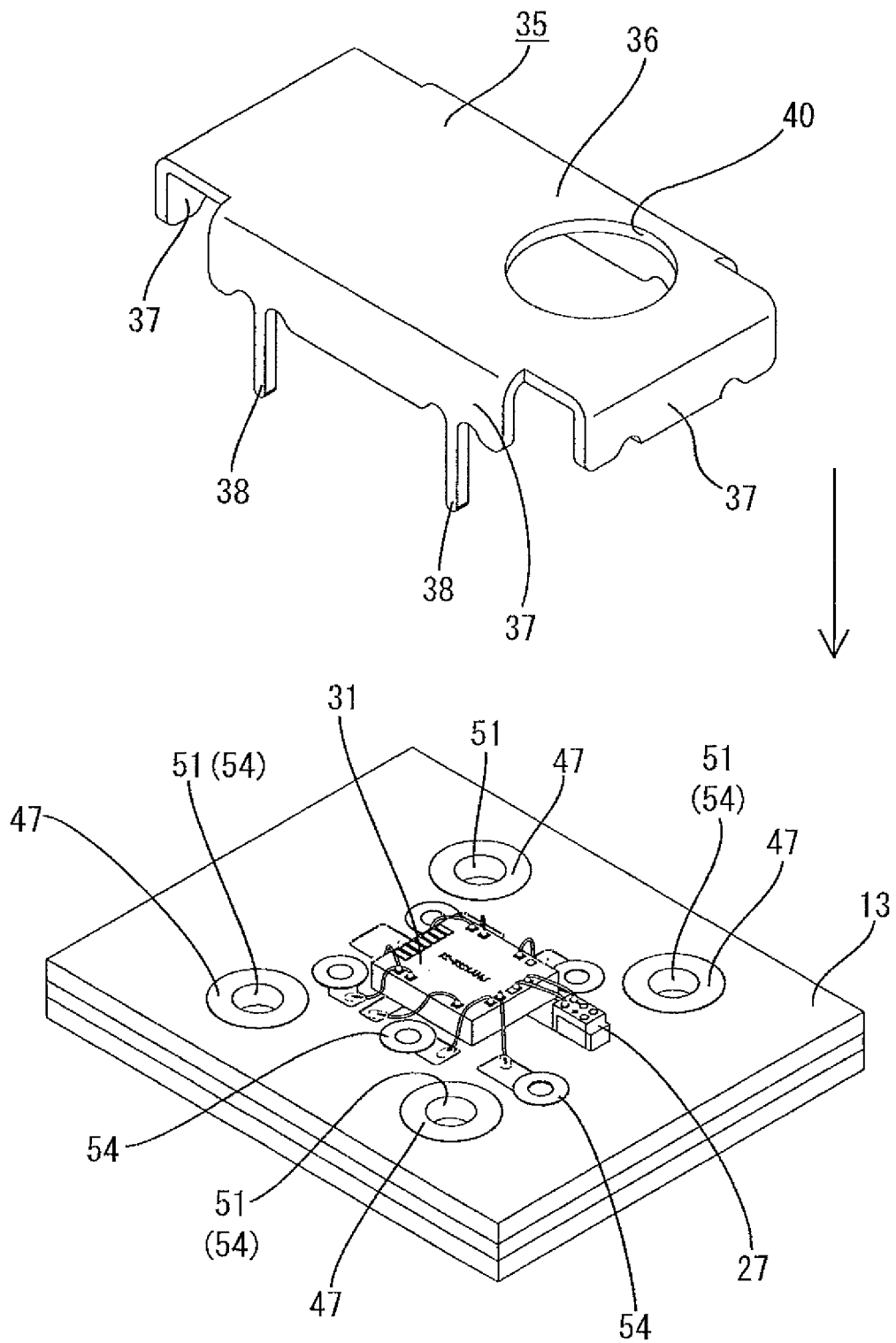
FIG. 6 is a perspective view illustrating a step of attaching the shielding member onto a circuit board.
Figure 7:
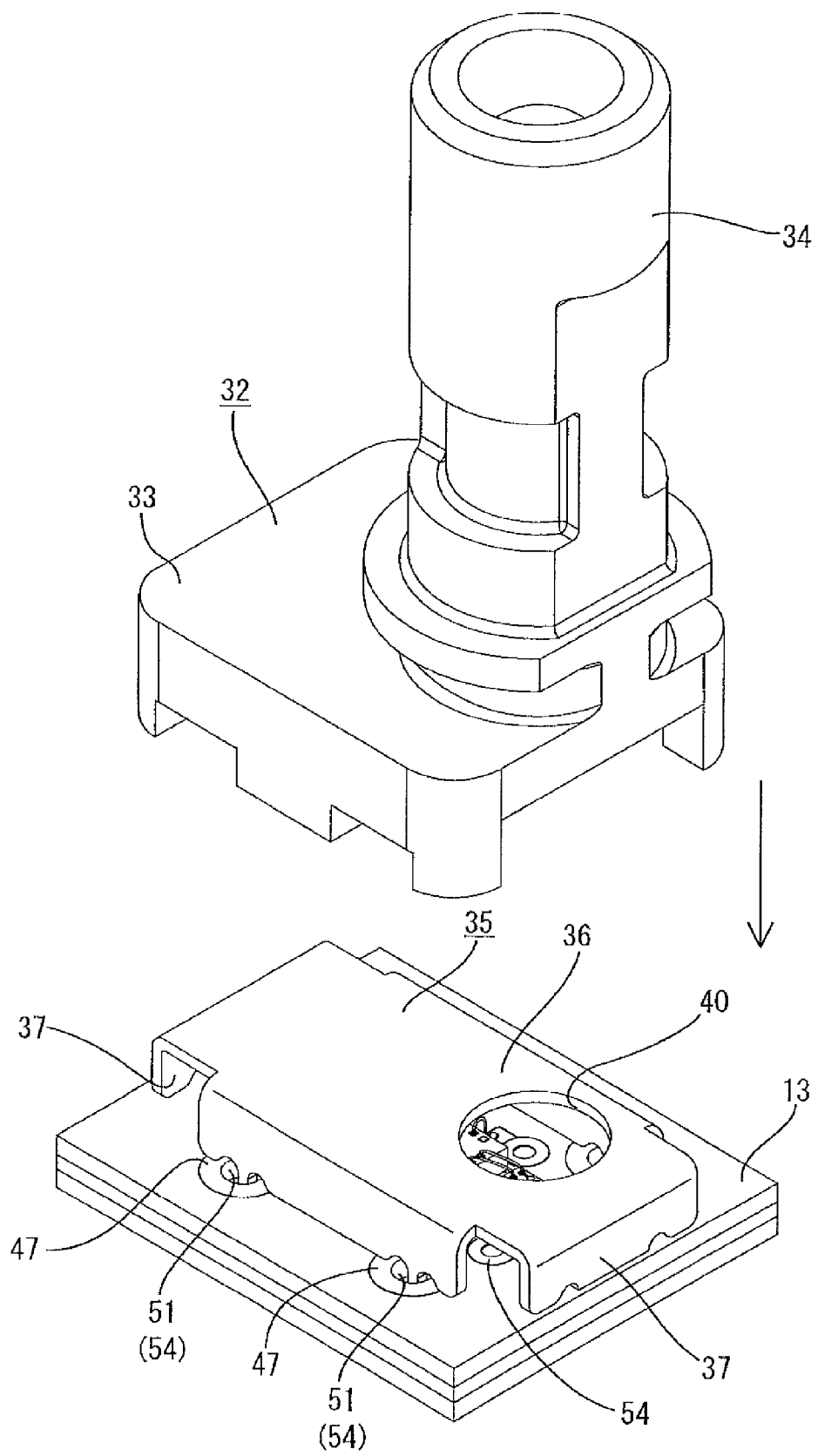
FIG. 7 is a perspective view illustrating a step of attaching the resin member onto the shielding member and the circuit board.

Next, an example of the production process of the optical assembly 50 according to this embodiment will be explained. Initially, as illustrated in FIG. 6, the photoelectric conversion element 27 and the electric component 31 are connected to the electrically conductive path formed on the circuit board 13 by a conventional method such as a reflow soldering.

Then, the shielding member 35 obtained by pressing a metal plate into a predetermined shape is attached to the circuit board 13 so as to cover the photoelectric conversion element 27 and the electric component 31. At this time, the board connection portions 38 of the shielding member 35 are inserted into the respective through holes 51 of the circuit board 13 from above. Thereafter, the board connection portions 38 are each connected to the electrically conductive path of the through hole 51 by a conventional method such as a flow soldering.

Subsequently, the resin member 32 is attached to the circuit board 13 so as to cover the shielding member 35. More specifically described, an adhesive is applied onto a surface of the resin member 32 that faces the shielding member 35 to bond the resin member 32 and the shielding member 35 via the adhesive. Accordingly, the optical assembly 50 according to this embodiment is accomplished.

Effects and Advantages

Next, effects and advantages to be obtained by the optical assembly 50 according to this embodiment will be explained. According to this embodiment, the photoelectric conversion element 27 is connected to the circuit board 13 on which the electrically conductive path is formed by printed wiring technique. This reduces the cost compared with the case in which the photoelectric conversion element 27 is connected to a stem made of metal.

The lens 39 is integrally included in the resin member 32 that is made of light transmissive synthetic resin and has the sleeve 34. Accordingly, a step of fixing the lens 39 onto a separate member made of a material different from the lens 39 is not required. This reduces the production cost of the optical assembly 50.

According to this embodiment, the shielding member 35 includes the board connection portions 38 elongated toward the circuit board 13. The board connection portions 38 are soldered to the electrically conductive path formed on the circuit board 13. Accordingly, the shielding member 35 is fixed to the circuit board 13 by soldering and electrically connected to the electrically conductive path formed on the circuit board 13. In this configuration, the step of fixing the shielding member 35 to the circuit board 13 and the step of electrically connecting the shielding member 35 and the electrically conductive path formed on the circuit board 13 can be performed in one step. This reduces the number of production steps and further reduces the production cost.

Further, according to this embodiment, the side plates 37 of the shielding member 35 are in contact with the plate surface of the circuit board 13. Accordingly, the shielding member 35 can also be positioned with respect to the circuit board 13 by the side plates 37 of the shielding member 35. This improves accuracy of positioning of the shielding member 35 with respect to the circuit board 13.

Second Embodiment

Next, a second embodiment of the present invention will be described with reference to FIG. 8 to FIG. 12. In the optical assembly 50 according to this embodiment, the resin member 32 is produced by insert molding in which the shielding member 35 as an insert is integrated with the synthetic resin. Legs 52 extending from the top plate 36 of the shielding member 35 protrude outwardly from the base 33 of the resin member 32. The legs 52 are bent downwardly (to the circuit board 13 side) at a right angle after the insertion molding. Lower edges of the legs 52 are substantially flush with a lower edge of the resin member 32.

(Connection Structure Between the Resin Member 32 and the Circuit Board 13)

The through holes 51 formed in the circuit board 13 each have an inner diameter larger than an outer diameter of each of the board connection portions 38 included in the shielding member 35. With this configuration, while the board connection portions 38 are inserted into the through holes 51 without being soldered, the resin member 32 that is formed to integrally include the shielding member 35 by insert molding can move in a direction parallel to the plate surface of the circuit board 13. In this embodiment, a difference between the inner diameter of the through hole 51 and the outer diameter of the board connection portion 38 is equal to or slightly larger than an assembly tolerance between the resin member 32 and the circuit board 13 in the direction parallel to the plate surface of the circuit board 13 for the adjustment of the optical axis between the photoelectric conversion element 27 and the sleeve 34. Accordingly, the resin member 32 can be moved relative to the circuit board 13 within a range that is equal to or slightly larger than the assembly tolerance between the resin member 32 and the circuit board 13 in the direction parallel to the plate surface of the circuit board 13 for the adjustment of the optical axis between the photoelectric conversion element 27 and the sleeve 34.

The other configurations are substantially the same as those of the first embodiment, and thus the same parts are designated with the same number as the first embodiment and will not be explained.

(Production Process)

Figure 8:
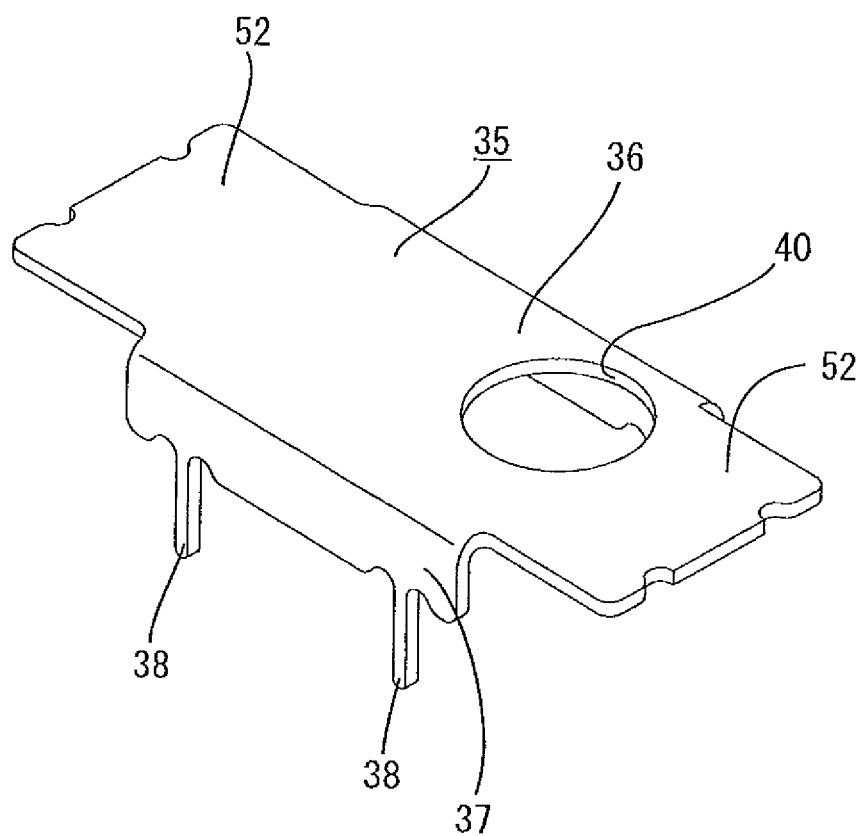
FIG. 8 is a perspective view illustrating a shielding member of an optical assembly according to a second embodiment of the present invention.

Next, an example of the production process of the optical assembly 50 according to this embodiment will be explained. Initially, as illustrated in FIG. 8, the shielding member 35 is obtained by pressing a metal plate. At this state, the legs 52 extend in a direction along the plate surface of the top plate 52.

Figure 9:
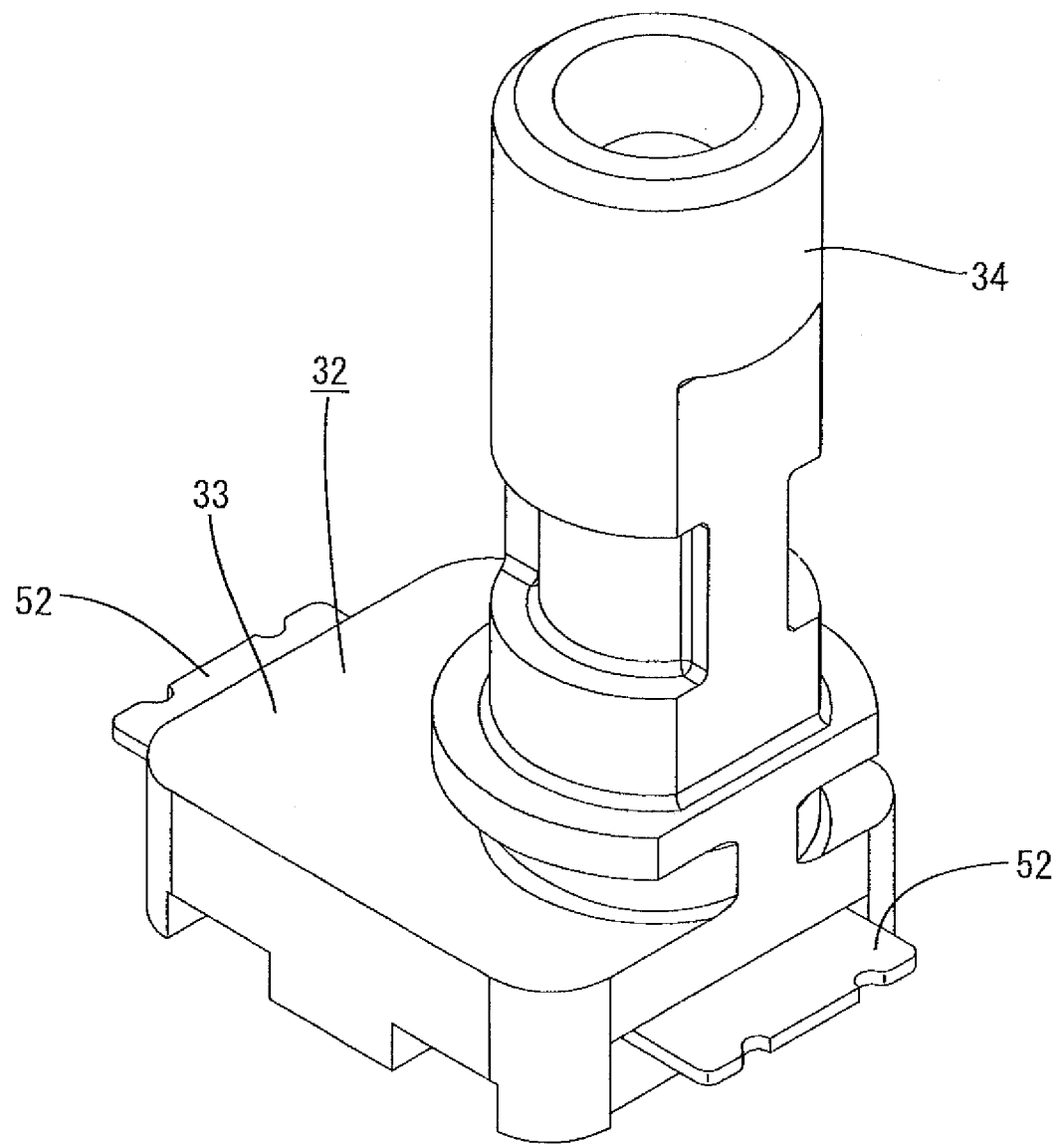
FIG. 9 is a perspective view of a resin member.

Then, as illustrated in FIG. 9, the resin member 32 is produced by insert molding in which the shielding member 35 as an insert is integrated with the resin member 32 with the synthetic resin. In this state, the legs 52 protruding from the base 33 of the resin member 32 extend in a direction substantially perpendicular to an axis of the sleeve 34. In this configuration in which the legs 52 protrude in the direction perpendicular to the axis of the sleeve 34, spaces below the legs, i.e., spaces located between the legs 52 and the circuit board 13, can be filled with the synthetic resin. This improves accuracy of positioning of the resin member 32.

Figure 10:
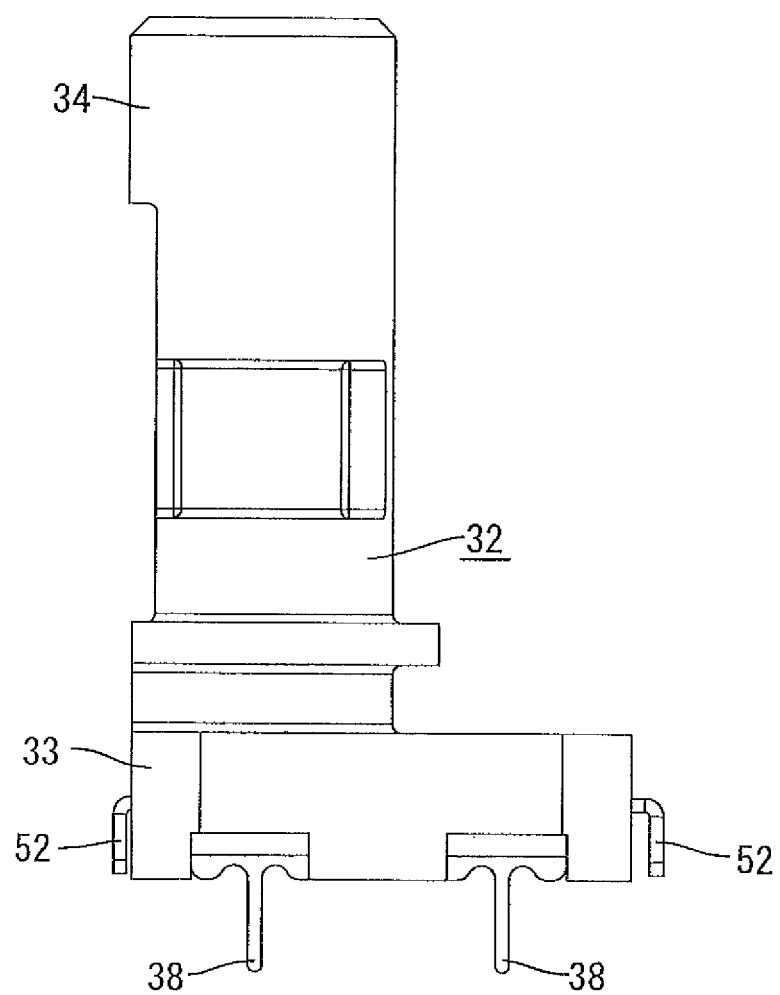
FIG. 10 is a side view illustrating the resin member in which legs are bent.
Figure 11:
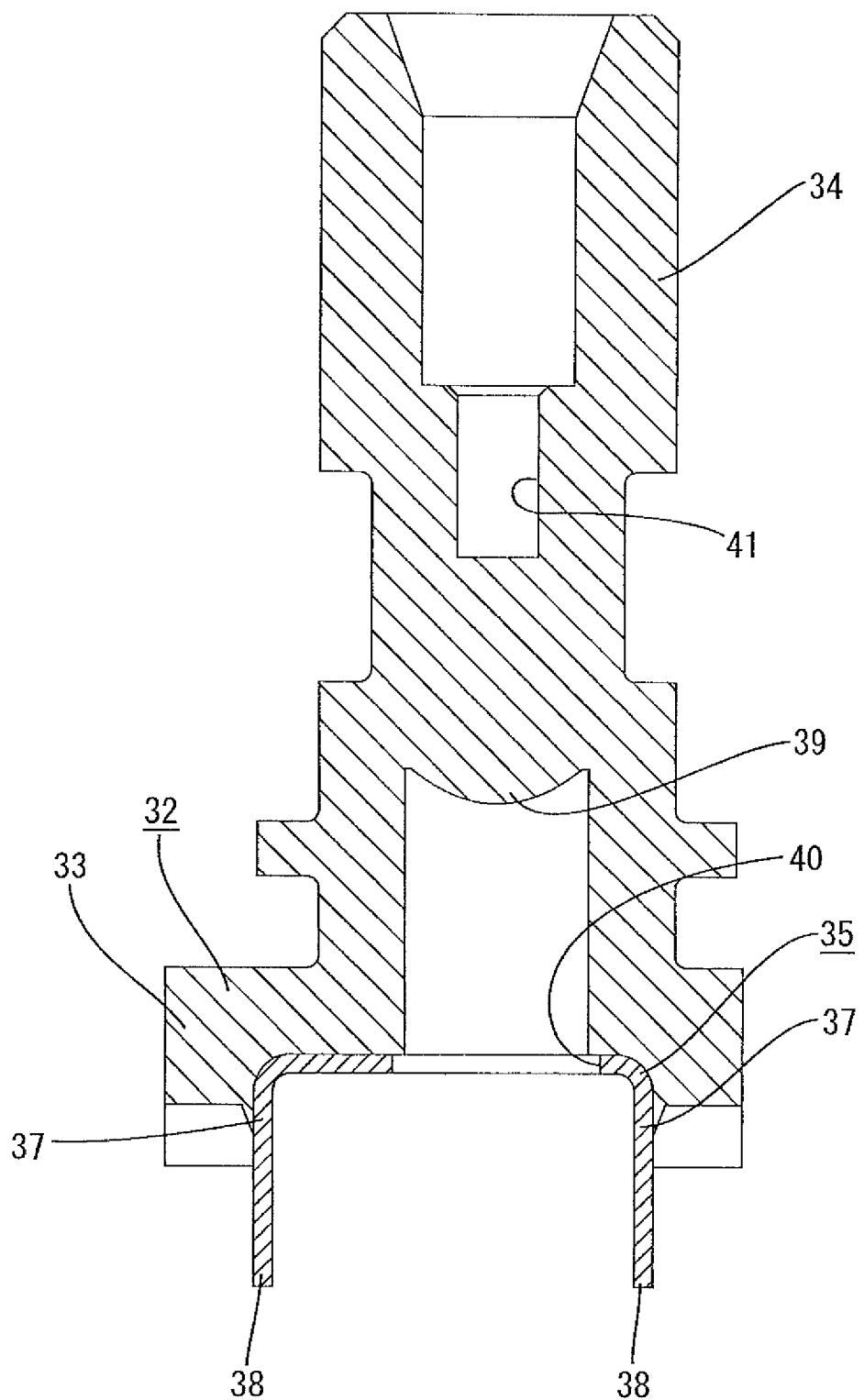
FIG. 11 is a cross-sectional view illustrating the resin member.
Figure 12:
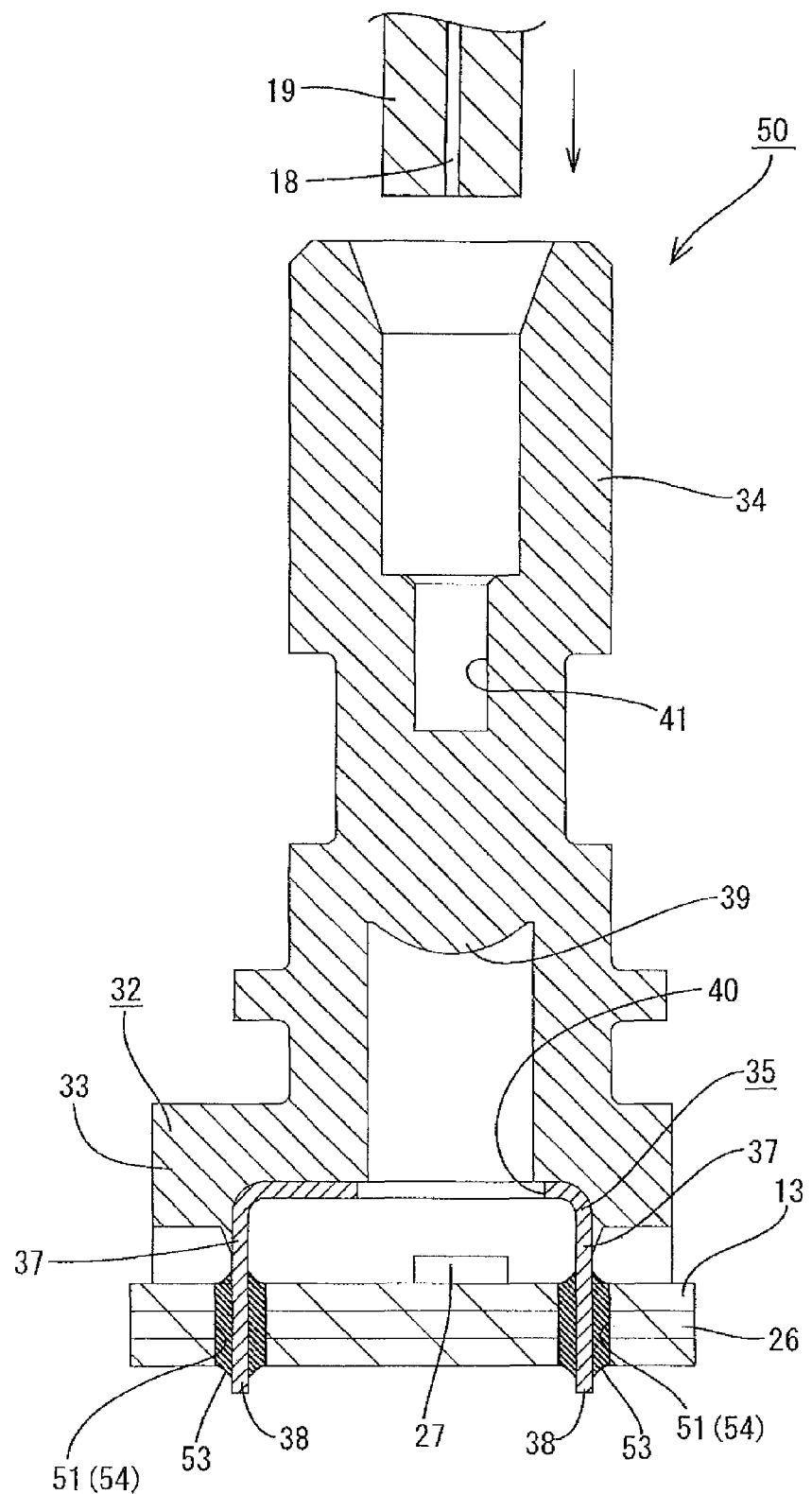
FIG. 12 is a cross-sectional view illustrating the optical assembly.

Then, as illustrated in FIG. 10, the legs 52 are bent downwardly. In this state, lower edges of the legs 52 are substantially flush with the lower edge of the resin member 32.

Thereafter, the board connection portions 38 of the shielding member 35 are inserted into the respective through holes 51 of the circuit board 13. In this state, the resin member 32 is moved in the direction parallel to the plate surface of the circuit board 13 to adjust the optical axis between the photoelectric conversion element 27 mounted on the circuit board 13 and the sleeve 34 of the resin member 32. As described above, the resin member 32 can move relative to the circuit board 13 within the range that is equal to or slightly larger than the assembly tolerance between the resin member 32 and the circuit board 13 in the direction parallel to the plate surface of the circuit board 13 for the adjustment of the optical axis between the photoelectric conversion element 27 and the sleeve 34.

After the adjustment of the optical axis between the photoelectric conversion element 27 and the sleeve 34, each of the board connection portions 38 is soldered to the corresponding electrically conductive path of the through holes 51. Accordingly, the resin member 32 is fixed to the circuit board 13 and the shielding member 35 is electrically connected with the electrically conductive path of the circuit board 13. Thus, the optical assembly 50 according to this embodiment is accomplished.

Effects and Advantages

Next, effects and advantages of the optical assembly 50 according to this embodiment will be explained. According to this embodiment, the resin member 32 is produced by insert molding in which the shielding member 35 as the insert is integrated with the synthetic resin. Accordingly, the step of producing the resin member 32 and the step of integrating the resin member 32 and the shielding member 35 can be performed in one step. This does not require the step of fitting the resin member 32 with the shielding member 35 that are separately members, and thus the production cost can be reduced.

Further, according to this embodiment, the legs 52 of the shielding member 35 protrude from an outer surface of the resin member 32 and the legs 52 are bent toward the circuit board 13 to be in contact with the plate surface of the circuit board 13. Accordingly, the resin member 32 can also be positioned with respect to the circuit board 13 by the legs 52 of the shielding member 35. This improves accuracy of the positioning of the resin member 32 with respect to the circuit board 13.

Further, according to this embodiment, the optical axis between the photoelectric conversion element 27 and the sleeve 34 can be adjusted by moving the resin member 32 in the direction parallel to the plate surface of the circuit board 13 while the board connection portions 38 of the shielding member 35 are inserted into the through holes 51. After the adjustment of the optical axis, the board connection portions 38 of the shielding member 35 and the through holes 51 are soldered to fix the resin member 32 and the circuit board 13. Accordingly, the optical axis between the photoelectric conversion element 27 and the sleeve 34 can be adjusted with high accuracy.

Third Embodiment

Figure 13:
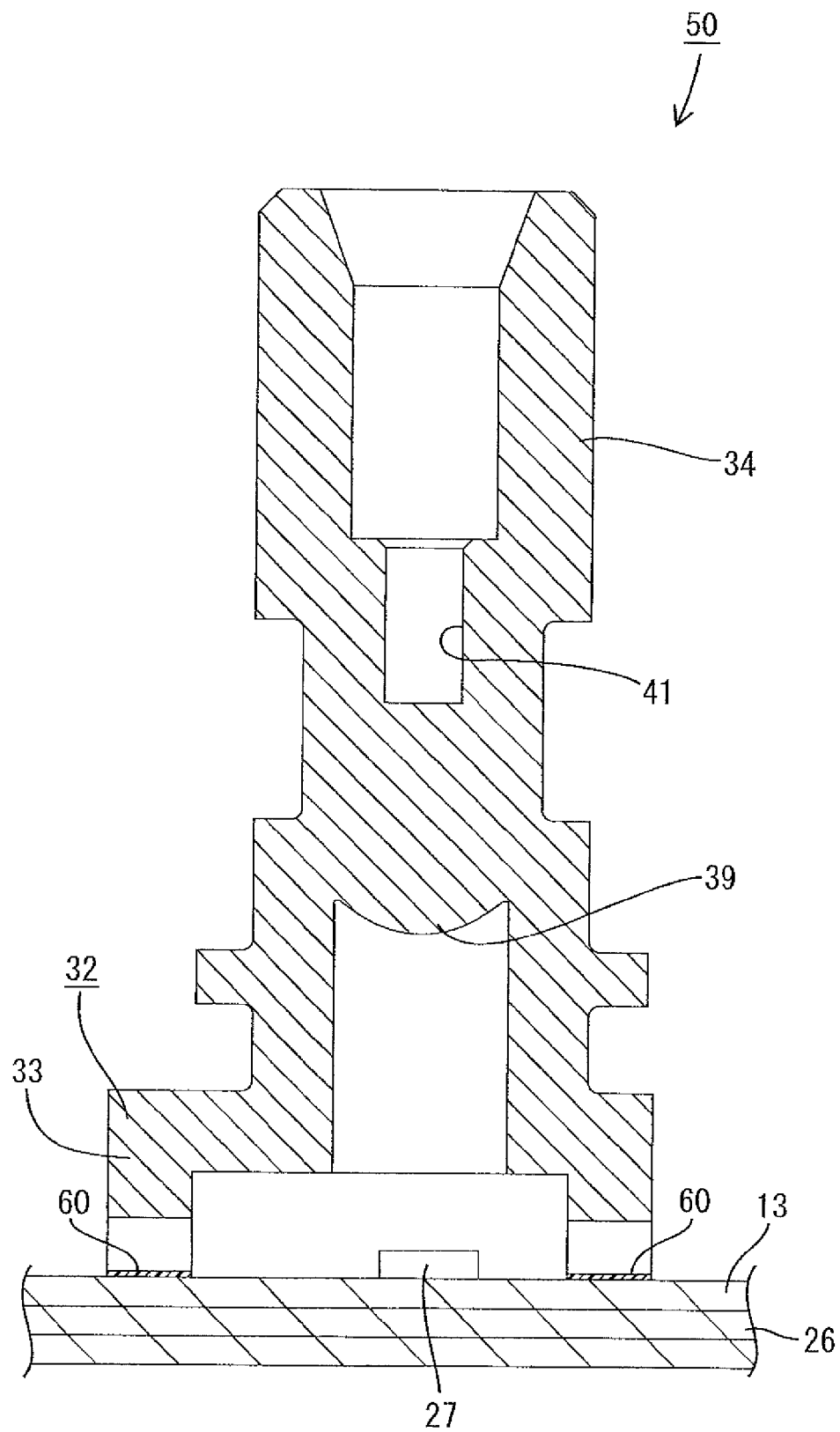
FIG. 13 is a cross-sectional view illustrating a connection structure between a resin member and a circuit board included in an optical assembly according to a third embodiment of the present invention.

Next, a third embodiment of the present invention will be described with reference to FIG. 13 and FIG. 14. As illustrated in FIG. 13, the resin member 32 is bonded to the upper surface of the circuit board 13 via an adhesive layer 60. Examples of adhesive constituting the adhesive layer 60 include epoxy resin adhesive and acrylic resin adhesive. Any adhesive may be suitably selected and used as necessary.

Figure 14:
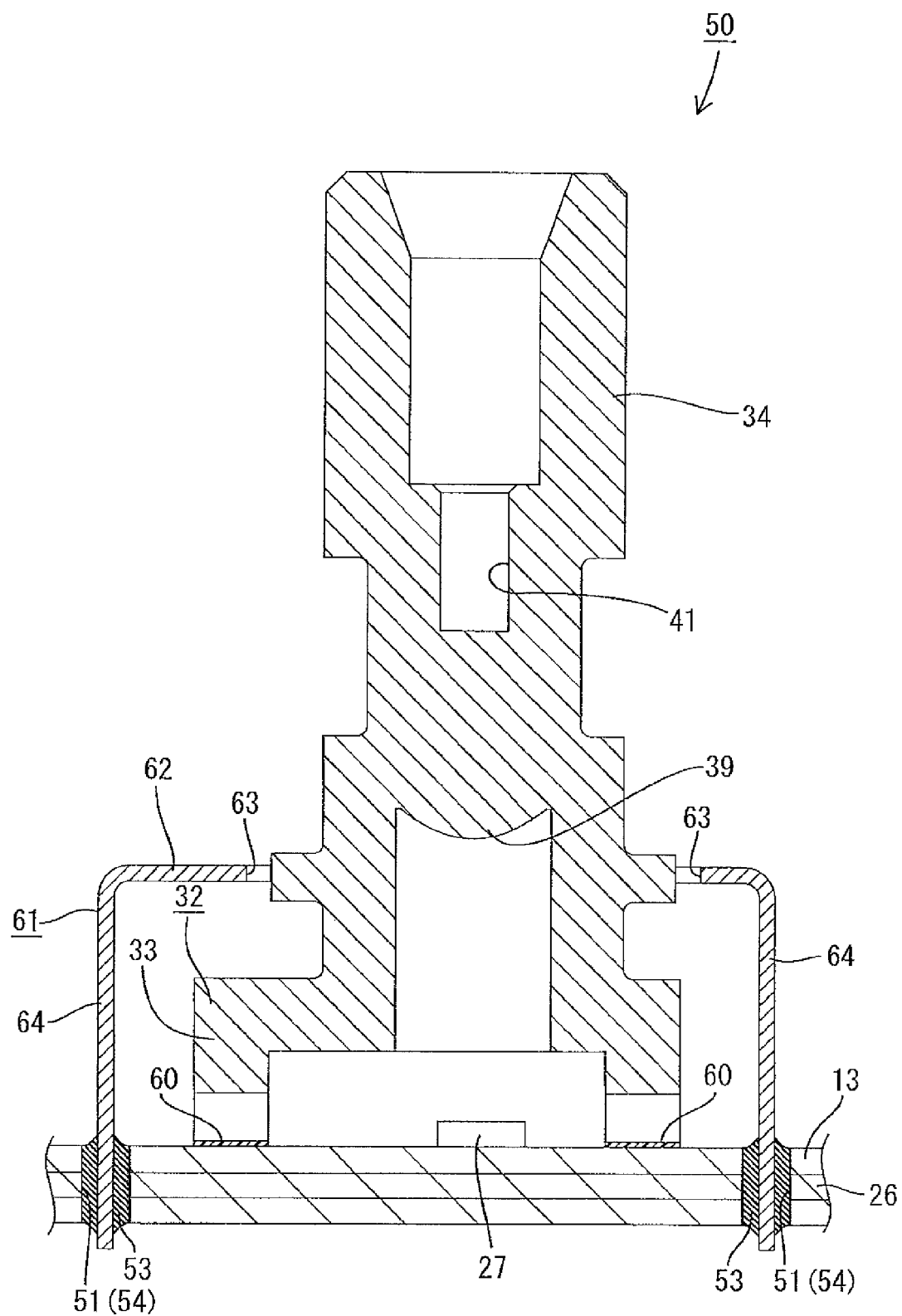
FIG. 14 is a cross-sectional view illustrating an optical assembly according to a fourth embodiment of the present invention.

As illustrated in FIG. 14, a shielding member 61 made of metal is attached to the circuit board 13 from a top of the resin member 32. The shielding member 61 includes a top plate 62 having a window 63 through which the sleeve 34 of the resin member 32 passes. The window 63 is provided such that the optical path extending between the sleeve 34 and the photoelectric conversion element 27 passes therethrough. The window 63 has an inner diameter that is larger than a maximum outer diameter of the sleeve 34.

The shielding member 61 is attached to the circuit board 13 so as to cover substantially the entire of the base 33 of the resin member 32. Accordingly, the photoelectric conversion element 27 mounted on the circuit board 13 is electromagnetically shielded.

The shielding member 61 includes side plates 64 extending downwardly from side edges of the top plate 62. The shielding member 61 further includes board connection portions 65 extending downwardly from a lower edge of each side plates 63. The board connection portions 65 are inserted into the respective through holes 51 of the circuit board 13, and then soldered to the electrically conductive path 54 of each through hole 51 and each land 47 by a conventional method such as a flow soldering. The through holes 51 are each filled with the solder 53 that is solidified after being melted.

The other configurations are substantially the same as those of the first embodiment, and thus the same parts are designated with the same number as the first embodiment and will not be explained.

To fix the resin member 32 and the circuit board 13, an adhesive is applied to at least one of the resin member 32 and the circuit board 13. Then, the resin member 32 is attached to the circuit board 13 at a predetermined position and the adhesive is cured. The adhesive is cured by a conventional method. For example, the adhesive may be heated at a predetermined temperature, or the adhesive may be left for a predetermined time. Accordingly, the resin member 32 and the circuit board 13 are bonded via the adhesive layer 60.

Then, the shielding member 61 is arranged closer to the circuit board 13 from above. At this time, the sleeve 34 of the resin member 32 is passed through the window 63 of the shielding member 61.

Subsequently, the board connection portions 65 of the shielding member 61 are inserted into the respective through holes 51 from above. Then, each of the board connection portions 38 is connected to the corresponding electrically conductive path of the through holes 51 by a conventional method such as a flow soldering.

As described above, according to this embodiment, the resin member 32 and the circuit board 13 are fixed together by simply applying and curing the adhesive. This simplifies the production process of the optical assembly 50.

Fourth Embodiment

Figure 15:
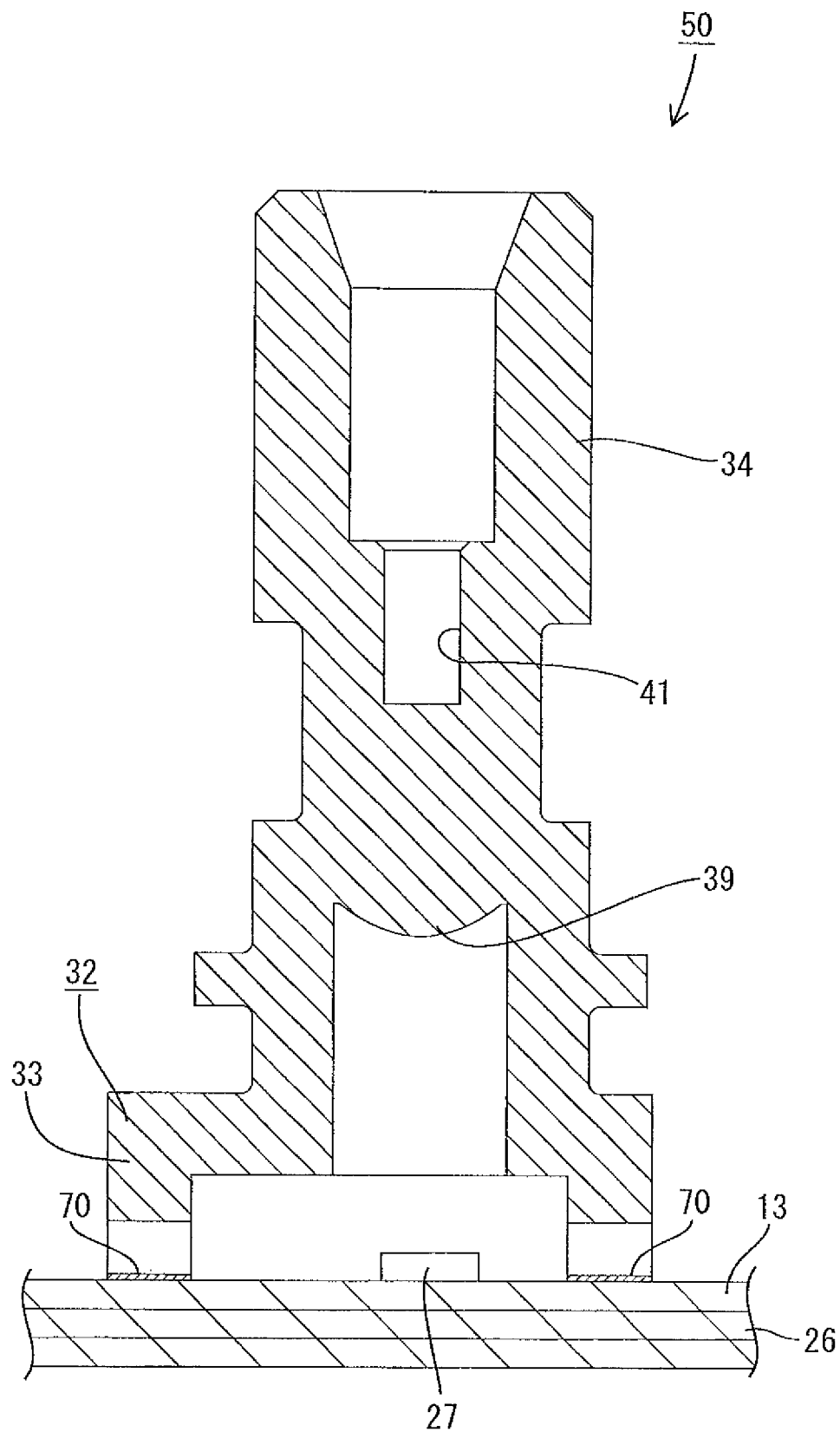
FIG. 15 is a cross-sectional view illustrating a connection structure between a resin member and a circuit board included in an optical assembly according to a fourth embodiment of the present invention.

Next, a fourth embodiment of the present invention will be described with reference to FIG. 15. As illustrated in FIG. 15, the resin member 32 is bonded to an upper surface of the circuit board 13 via an adhesive sheet (an adhesive layer) 70. Examples of synthetic resin constituting the adhesive sheet 70 include a thermosetting resin and a thermoplastic resin. Any synthetic resin may be suitably selected and used as necessary.

The other configurations are substantially the same as those of the third embodiment, and thus the same parts are designated with the same number as the third embodiment and will not be explained.

To fix the resin member 32 with the circuit board 13, initially, the adhesive sheet 70 is placed at a predetermined position of the circuit board 13. Then, the resin member 32 is placed on the adhesive sheet 70.

Thereafter, the adhesive sheet 70 is heated. If the adhesive sheet 70 is made of a thermoplastic resin, the adhesive sheet 70 is melted and then cured by cooling, whereby the circuit board 13 and the resin member 32 are bonded together via the adhesive sheet 70.

If the adhesive sheet 70 is made of a thermosetting resin, the resin member 32 is placed on a semi-cured adhesive sheet 70 and cured by heating, whereby the circuit board 13 and the resin member 32 are bonded together via the adhesive sheet 70.

The adhesive sheet 70 may be heated by any method such as an irradiation of laser, an ultrasonic vibration, or heating in a heating furnace. Any heating method may be employed as necessary.

According to this embodiment, the resin member 32 and the circuit board 13 can be fixed together by a simple process including placing the resin member 32 on the adhesive sheet 70 placed on the upper surface of the circuit board 13, and then heating the adhesive sheet 70. This simplifies the production process of the optical assembly.

Fifth Embodiment

Figure 16:
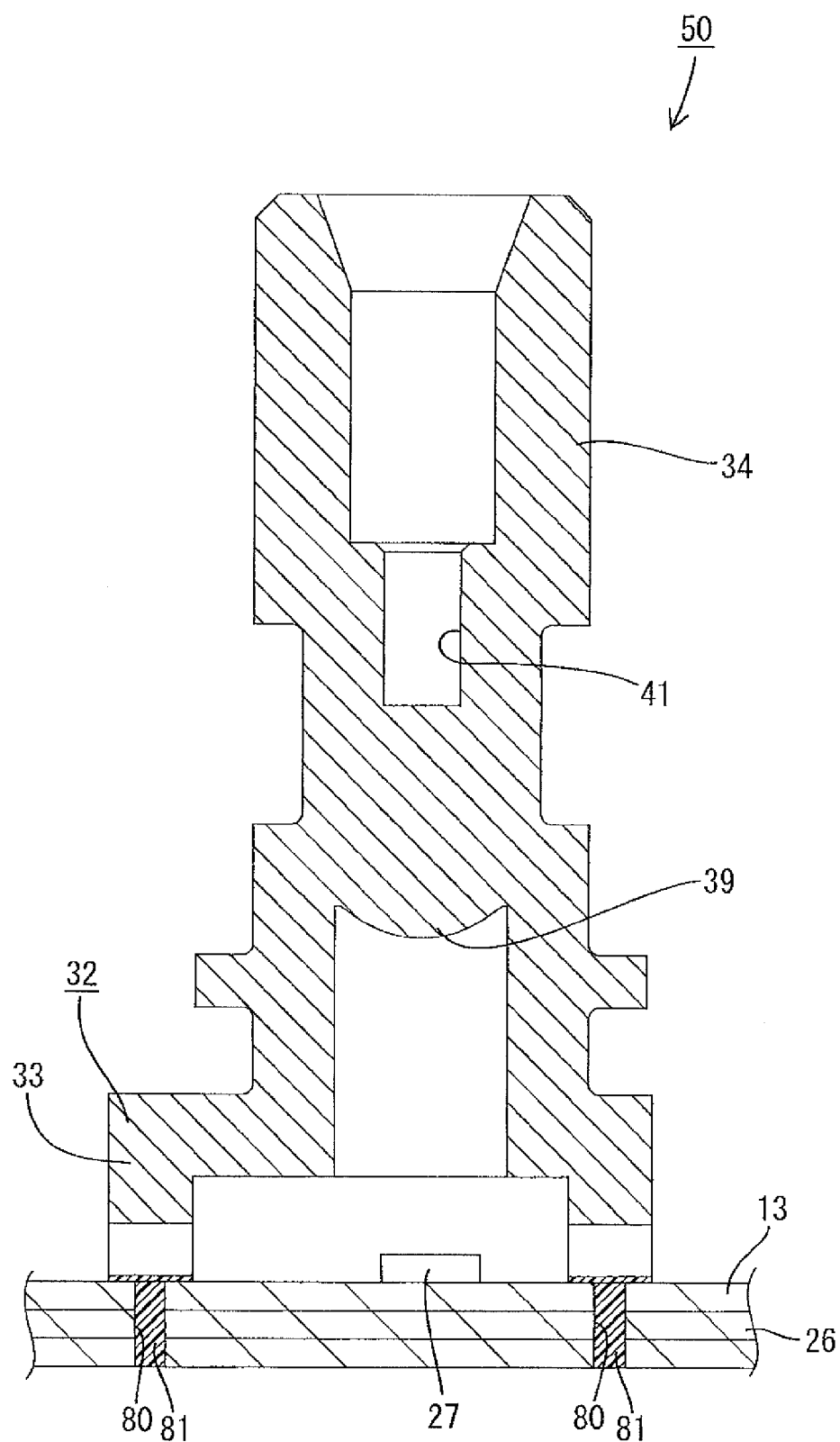
FIG. 16 is a cross-sectional view illustrating a connection structure between a resin member and a circuit board included in an optical assembly according to a fifth embodiment of the present invention.

Next, a fifth embodiment of the present invention will be described with reference to FIG. 16. As illustrated in FIG. 16, resin fixing portions 80 are formed through the circuit board 13 in the vertical direction. The resin fixing portion 80 may be a through hole, a hole with a bottom, a slit, or a groove with a bottom.

The above-described resin fixing portions 80 are each filled with a welding resin 81 including a thermosetting resin. The welding resin 81 may fill the resin fixing portions 80 by insert molding, or may be press-fitted into the resin fixing portion 80. The welding resin 81 may fill the resin fixing portion 80 by any method as necessary. The welding resin 81 is provided such that an upper part thereof is exposed on the upper surface of the circuit board 13.

The resin member 32 is welded with the welding resin 81 while the resin member 32 is placed on the upper part of the welding resin 81 that is exposed on the upper surface of the circuit board.

The other configurations are substantially the same as those of the third embodiment, and thus the same parts are designated with the same number as the third embodiment and will not be explained.

Initially, the resin fixing portions 80 are formed in the circuit board 13. The resin fixing portions 80 may be formed by drilling the circuit board 13 with a drill, which is not illustrated, or by cutting the circuit board 13 with a cutter, which is not illustrated, for example.

Then, the resin fixing portions 80 are filled with the welding resins 81. If the resin fixing portions 80 are filled with the welding resins 81 by insert molding, the circuit board 13 is placed in a mold, which is not illustrated, and then the melted thermosetting resin is injected into the mold and then cured.

If the welding resins 81 are press-fitted into the resin fixing portions 80, the welding resins 81 are formed in a predetermined shape by injection molding. Then, the welding resins 81 are press-fitted into the resin fixing portions 80.

Next, the resin member 32 is placed on the upper parts of the welding resins 81 exposed on the upper surface of the circuit board 13.

Thereafter, the welding resins 81 are heated. The welding resins 81 are melted and then cured by cooling, whereby the circuit board 13 and the welding resins 81 are integrally welded.

The welding resin 81 may be heated by any method such as an irradiation of laser, an ultrasonic vibration, or heating in a heating furnace. Any heating method may be employed as necessary.

According to this embodiment, the welding resins 81 are provided in the circuit board 13 in advance. Accordingly, the resin member 32 and the circuit board 13 can be fixed together with a simple process including placing the resin member 13 on the circuit board 13, and then heating the welding resins 81. This simplifies the production process of the optical assembly 50.

Other Embodiments

The present invention is not limited to the embodiments described in the above description and explained with reference to the drawings. The following embodiments may be included in the technical scope of the present invention.

(1) The resin member 32 and the shielding member 35 may be configured to be bonded together with an adhesive. The resin member 32 and the shielding member 35 may be configured to be fixed together with any means as necessary.

(2) The resin member 32 and the circuit board 13 may be configured to be fixed together with any means such as a screw as necessary.

(3) The shielding member 35 and the circuit board 13 may be configured to be bonded together with an adhesive. The shielding member 35 and the circuit board 13 may be configured to be bonded together with any means as necessary.

(4) The board connection portions 38 each may have a lower end portion that is bent at a right angle to have an L shape. The lower end portion of the board connection portion 38 may be placed on and soldered to the electrically conductive path 54 formed on the upper surface of the circuit board 13.

(5) The board connection portions 38 inserted into the through holes 51 each may have a portion protruded downwardly from a lower surface of the circuit board 13. The portion may be bent at a right angle to be fixed to the lower surface of the circuit board 13 such that the shielding member 35 and the circuit board 13 are fitted together.

Means for Solving the Problems

An optical assembly according to the technology disclosed herein includes a circuit board including an electrically conductive path formed by printed wiring technology, a photoelectric conversion element connected to the circuit board via the electrically conductive path, a shielding member made of metal, and a resin member made of light transmissive synthetic resin and attached to the circuit board. The shielding member is connected to the circuit board and arranged to cover the photoelectric conversion element. The resin member includes a sleeve into which a ferrule attached to an end of an optical fiber is inserted. The resin member integrally includes a lens through which an optical path passes. The optical path extends between the photoelectric conversion element. The shielding member includes a window through which the optical path extends to the photoelectric conversion element.

According to the technology disclosed herein, the photoelectric conversion element is connected to the circuit board including the electrically conductive path formed by printed wiring technology. Accordingly, the cost is reduced compared with a case in which the photoelectric conversion element is connected to the metal stem.

The lens is integrally included in the resin member that is made of light transmissive synthetic resin and has the sleeve. In this configuration, a lens is not required to be fixed to a separate member that is made of a material different from the lens. This reduces the production cost of the optical assembly.

The following configurations are preferable as the embodiments according to the technology described herein.

The resin member is preferably formed by insert molding in which the shielding member as an insert is integrated with a synthetic resin.

With the above-described configuration, the step of producing the resin member and the step of integrating the resin member and the shielding member can be performed in one step. This does not require the step of fitting the resin member with the shielding member that are separate members, and thus the production cost can be reduced.

Preferably, the resin member is formed such that legs of the shielding member are protruded from an outer surface of the resin member, and the legs are bent toward the circuit board so as to be in contact with a plate surface of the circuit board.

With the above-described configuration, the resin member can be positioned with respect to the circuit board by the legs of the shielding member. This improves accuracy of positioning of the resin member with respect to the circuit board.

Preferably, the shielding member includes a board connection portion elongated toward the circuit board, and the board connection portion is soldered to the electrically conductive path formed on the circuit board.

With the above-described configuration, the shielding member can be fixed to the circuit board by soldering and can be electrically connected to the electrically conductive path formed on the circuit board. Accordingly, the step of fixing the shielding member to the circuit board and the step of electrically connecting the shielding member and the electrically conductive path formed on the circuit board can be performed in one step. This reduces the number of production step, and thus reduces the production cost.

Preferably, the resin member is formed by insert molding in which the shielding member as an insert is integrated with a synthetic resin. Preferably, the board connection portion is inserted and soldered to a through hole extending through the circuit board, and a difference between an inner diameter of the through hole and an outer diameter of the board connection portion is equal to or slightly larger than an assembly tolerance between the resin member and the circuit board for an adjustment of the optical axis between the photoelectric conversion element and the sleeve in a direction parallel to a plate surface of the circuit board.

With the above-described configuration, the optical axis between the photoelectric conversion element and the sleeve can be adjusted by moving the resin member in the direction parallel to the plate surface of the circuit board while the board connection portions of the shielding member are inserted through the through holes. After the adjustment of the optical axis, the board connection portions of the shielding member and the through holes are soldered to fix the resin member and the circuit board. Accordingly, the optical axis between the photoelectric conversion element and the sleeve can be adjusted with high accuracy.

Effect to be Obtained by the Technology Disclosed Herein

According to the technology disclosed herein, the production cost of the optical assembly is reduced.

The invention claimed is:

1. An optical assembly comprising:
   a circuit board including an electrically conductive path formed by printed wiring technology;
   a photoelectric conversion element connected to the circuit board via the electrically conductive path;
   a resin member made of light transmissive synthetic resin and attached to the circuit board, the resin member including a sleeve into which a ferrule attached to an end of an optical fiber is inserted and integrally including a lens through which an optical path passes, the optical path extending between the sleeve and the photoelectric conversion element; and
   a shielding member made of metal, the shielding member being connected to the circuit board and arranged to cover the photoelectric conversion element, the shielding member including a window through which the optical path extends to the photoelectric conversion element, wherein
   the shielding member includes a top plate, a side plate, and a board connection portion, the board connection portion extending from the side plate and elongated toward the circuit board, and
   the board connection portion is soldered to the electrically conductive path formed on the circuit board.

2. The optical assembly according to claim 1, wherein the resin member integrally includes the shielding member, the resin member and the shielding member being integrated with a synthetic resin by insert molding.

3. The optical assembly according to claim 2, wherein the shielding member includes a top plate and legs extending from the top plate, and
   the resin member integrally includes the shielding member such that the legs of the shielding member are protruded from an outer surface of the resin member and bent toward the circuit board so as to be in contact with a plate surface of the circuit board.

4. The optical assembly according to claim 1, wherein
   the resin member integrally includes the shielding member, the resin member and the shielding member being integrated with a synthetic resin by insert molding,
   the circuit board includes a through hole extending in a thickness direction thereof, the board connection portion being inserted and soldered to a through hole, and
   a difference between an inner diameter of the through hole and an outer diameter of the board connection portion is substantially equal to an assembly tolerance between the resin member and the circuit board in a direction parallel to a plate surface of the circuit board for an adjustment of the optical axis between the photoelectric conversion element and the sleeve.

5. The optical assembly according to claim 1, wherein the resin member is bonded to the circuit board via an adhesive layer.

6. The optical assembly according to claim 1, wherein
   the circuit board includes a hole filled with a welding resin, the welding resin having an exposed portion exposed on a front surface of the circuit board, and
   the resin member is placed on the exposed portion and welded to the welding resin.

* * * * *